Oct. 27, 1936.     D. R. McGREGOR     2,058,707
AUTOMOBILE HEADLIGHT LENS
Filed Feb. 19, 1935

INVENTOR
Donald R. McGregor
BY
Worster & Davis
ATTORNEYS.

Patented Oct. 27, 1936

2,058,707

UNITED STATES PATENT OFFICE 2,058,707

AUTOMOBILE HEADLIGHT LENS

Donald R. McGregor, Norwalk, Conn.

Application February 19, 1935, Serial No. 7,193

4 Claims. (Cl. 240—41.4)

This invention relates to new and useful improvements in automobile headlight lenses.

With the headlights now in use if two automobiles are approximately the same distance from a ninety degree intersection, for example, the driver of neither automobile can see either the head or tail lights of the other automobile as neither automobile has its headlights on the other. When there is dust in the air or a fog the drivers may see the reflection of the headlights of the approaching automobiles. However, when there is neither fog nor dust to reflect headlight beams many accidents occur at street intersections.

An object of the invention is to provide an automobile headlight lens constructed to provide a light clearly visible from the side of the automobile.

Another object is to provide an automobile headlight lens constructed to direct light sidewise at approximately ninety degrees to the path of travel of the automobile, and which also provides for the spreading either or both horizontally and vertically of the light so directed. In other words, the chief object of my invention is to cause an automobile to give off light horizontally in all directions so that its presence will be clearly indicated in the absence of all other light.

Other objects and advantages will become apparent from a consideration of the following detailed description taken in connection with the accompanying drawing wherein satisfactory embodiments of the invention are shown. However, it will be understood that the invention is not limited to the details disclosed but includes all such variations and modifications as fall within the spirit of the invention and the scope of the appended claims.

Figure 1:
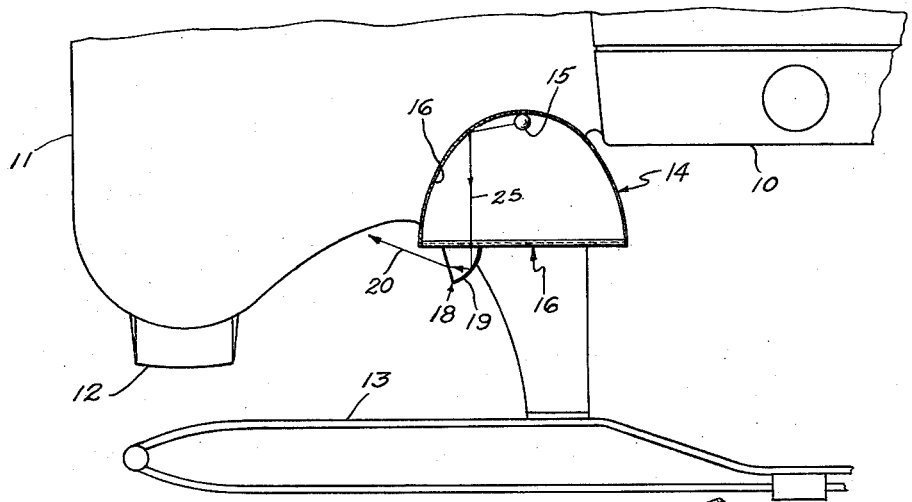
Fig. 1 is a top plan view of the forward right hand portion of an automobile the headlight of which shown somewhat diagrammatically is provided with a lens constructed according to my present invention.

Referring in detail to the drawing, in Fig. 1 is shown the forward right hand portion of an automobile including a radiator 10, the front right fender 11, wheel 12, and bumper portion 13. A headlight 14 is mounted in any or the usual manner and includes an electric bulb or other light source 15 and a reflector 16, the forward open end of which is closed by my improved headlight lens 16 mounted in any or the usual manner.

Figure 2:
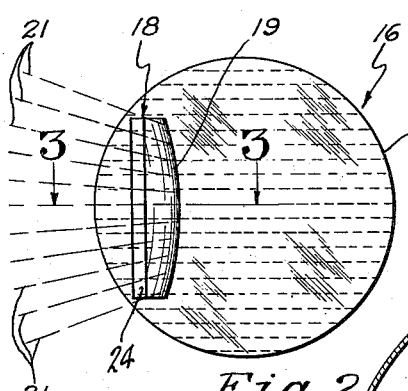
Fig. 2 is a front elevational view of the improved lens alone and on an enlarged scale.
Figure 3:
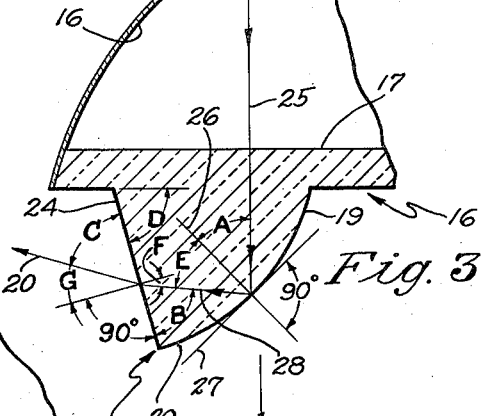
Fig. 3 is a sectional view taken substantially along the line 3—3 of Fig. 2.

The lens 16 may be of any or the usual size and shape, and on the forward face of the disc-like body portion 17 of the lens, is a glass prism 18, preferably located to the right of the vertical center line of the body of the lens and arranged to deflect to the right of the path of travel of the automobile a portion of the light passing through the lens body. As shown, the prism 18 in Figs. 1 through 3 is cast integral with the body 17 of the lens, and it is to be understood that if desired the prism 18 may be an insert of a color different from that of the lens body, as for example red or green. The prism is shown in the drawing as considerably larger in proportion to the whole lens than would probably be used, but it is so shown for greater clearness.

As shown here the prism 18 is relatively long and extends both above and below the horizontal center line of the lens body. The reflecting surface 19 of the prism is curved both horizontally and vertically as will be clear from a comparison of Figs. 1 and 2 or of Figs. 2 and 3, and due to this construction the light reflected or deflected by the inside surface of the glass air surface 19 of the prism is spread both horizontally and vertically. The horizontal spreading of the light reflected by the prism surface 19 is suggested by the line 20 in Figs. 1 and 3, and the vertical spreading of the light due to the vertical curvature of the reflecting surface 19 is suggested by the broken lines 21 in Fig. 2.

The outer surface 24 of the prism may be at right angles to the face of the lens 16 but it is preferred that it be inclined at an angle D less than 90° to the front surface of the headlight lens. For ordinary glass the angle of incidence, that is angle A between the incident ray of light 25 and the perpendicular 26 to the tangent 27 at the point of incidence must be greater than 42° (approximately) to produce total reflection on the glass side of a glass air surface. Since angle A equals angle of reflection E, the angle of the reflected ray 28 to the line 26, the minimum sum of the two angles for total reflection is 84°. The light ray can be bent to 6° more than 90° from its original course. With surface 24 at 90° to the front surface of the lens surface 16 the surface 24 would have little effect upon the reflected light ray 28. However, by making angle D considerably less than 90° it is possible by refraction to bend the light ray still further from its original direction as indicated at 20. For ordinary glass the angle of incidence F for the reflected ray 28 is two thirds the angle of refraction. That is $$\frac{\text{angle } G}{\text{angle } F} = \frac{3}{2}$$

It will therefore be seen that by inclining the wall 24 to the surface of the face of the body of lens 16 the ray can be bent much farther back making the light visible farther back at the side of the car and also illuminating the road or objects farther back at the side of the car.

It may be advisable to coat curved surface 19 in the region near the outer edge, indicated at 29, with light reflecting or non-transmitting material to prevent other rays of light from striking surface 24 directly and reflecting to the right through surface 19 near region 29.

It also may be desirable to coat this surface 19 in region 29 to reflect light beams from surface 16 through surface 24 in a still more backwardly direction. In some cases it might be desirable to coat the entire curved surface 19 with reflecting or non-transmitting material.

Figure 5:
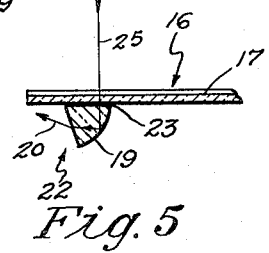
Fig. 5 is a view similar to Fig. 3 on a smaller scale but showing a modification.

Fig. 5 illustrates a slightly modified structure wherein a prism 22 is formed separate from the lens body 17 but is secured thereto by any suitable means such for example as an adhesive or cement as at 23. The reflecting surface 19 of the prism 22 is of the same shape as in the case of the prism 18 and functions in the manner described. The prism 22 may be colored, if desired. This prism is in all respects the same and functions in the same way as the above described prisms integral with the headlight lens, the only difference being that it is made as a separate element and attached to the front wall of the lens.

Figure 4:
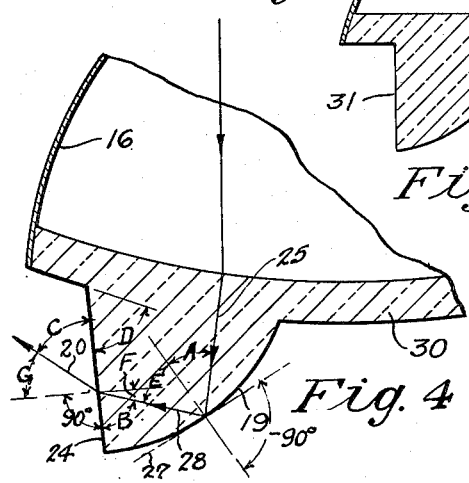
Fig. 4 is a section similar to Fig. 3 showing the effect of the prism when used on a curved lens.

In Fig. 4 the prism is shown on a curved lens 30 and with such a lens the beam of light 20 is bent still further back than with the flat lens of Figs. 1 and 3. If the lens is still further curved as is some of the newer headlight lenses some of the light will be bent still further back.

Figure 6:
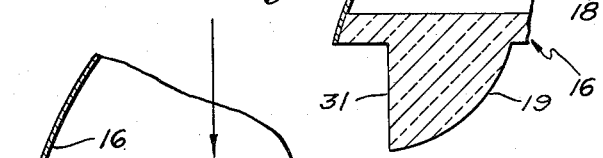
Fig. 6 shows another slight modification.

In Fig. 6 I have shown the prism with the sidewall 31 at substantially right angles to the front surface of the lens. With this arrangement the curved surface 19 should preferably be covered with reflecting material in order to reflect the light in a sideways and sufficiently backward direction to give the desired visibility.

From the foregoing description it will be apparent that essentially the invention comprises the adding of a glass prism to any or the standard automobile headlight lens. The prism is so arranged that a small portion of the light from the headlight reflector is deflected sideways by the prism from the direction of travel of the automobile.

It is to be understood that the right hand headlight and improved lens will deflect a portion of the light beam sideways and backwardly toward the right side of the automobile as shown and described and also that the left hand headlight and improved lens will in a similar manner deflect a portion of the light beam sideways and backwardly toward the left side of the automobile. The automobile will give off light horizontally in all directions so that its presence will be clearly indicated in the absence of all other light. This is fully illustrated in Fig. 1. It is to be understood that the prism may be cast integral with the glass headlight lens or may be attached thereto by various means, and that the prism may be colored.

Since the reflecting surface of the prism is curved both horizontally and vertically to spread the light horizontally and vertically a bright spot will be visible to a person at the side of the automobile no matter (within reasonable limits) what the vertical or horizontal position of said person relative to the automobile may be. With the construction of lens described, automobiles approaching intersections will be visible to one another so that collisions may be avoided. The relatively feeble light beam reflected toward the side of the road will in no way inconvenience drivers passing on the road, and is a convenience when parking an automobile since the driver is enabled to see objects at the side thereof. It is also noted that the improved lens may be substituted for those now in use without the necessity of changing the construction of clamping or supporting means now used for mounting lenses. The prism is so located that it deflects some of the less intense light from the edge portion of the headlight beam so does not materially reduce the illumination of the beam on the road and objects in front of the car.

Having thus set forth the nature of my invention, what I claim is:

1. In an automobile headlight having a reflector, a lens in front of the reflector including a body, a single upright glass prism projecting forwardly from the front face of the body and located adjacent the outer side edge of the lens, said prism being arranged to intercept light rays passing through the body and deflect such rays laterally toward the side of the car on which the light is located, said prism having a reflecting surface convexly curved horizontally to spread the reflected light horizontally, and the other face of the prism being inclined to the front face of the body of the lens at a sufficient angle to bend at least a portion of the reflected rays backwardly toward the rear of the car.

2. In an automobile headlight having a reflector, a lens in front of the reflector including a body, a single upright glass prism projecting forwardly from the front face of the body and located adjacent the outer side edge of the lens, said prism being arranged to intercept light rays passing through the body and deflect such rays laterally toward the side of the car on which the light is located, said prism having a reflecting surface convexly curved both horizontally and vertically to spread the reflected light horizontally and vertically, and the other face of the prism being inclined to the front face of the body of the lens at a sufficient angle to bend at least a portion of the reflected light rays backwardly toward the rear of the car.

3. In an automobile headlight having a reflector, a lens in front of the reflector including a body curved to provide a convex front face, a single upright glass prism projecting forwardly from said front face and located adjacent the outer side edge of the lens, said prism being arranged to intercept light rays passing through the body and deflect such rays laterally toward the side of the car on which the light is located, said prism having a reflecting surface convexly curved horizontally to spread the reflected light horizontally, and the other face of the prism being inclined to the front face of the body of the lens at a sufficient angle to bend at least a portion of the reflected rays backwardly toward the rear of the car.

4. In an automobile headlight having a reflector, a lens in front of the reflector including a body curved to provide a convex front face, a single upright glass prism projecting forwardly from said front face and located adjacent the outer side edge of the lens, said prism being arranged to intercept light rays passing through the body and deflect such rays laterally toward the side of the car on which the light is located, said prism having a reflecting surface convexly curved both horizontally and vertically to spread the reflected light horizontally and vertically, and the other face of the prism being inclined to the front face of the body of the lens at a sufficient angle to bend at least a portion of the reflected light backwardly toward the rear of the car.

DONALD R. McGREGOR.